UNITED STATES PATENT OFFICE.

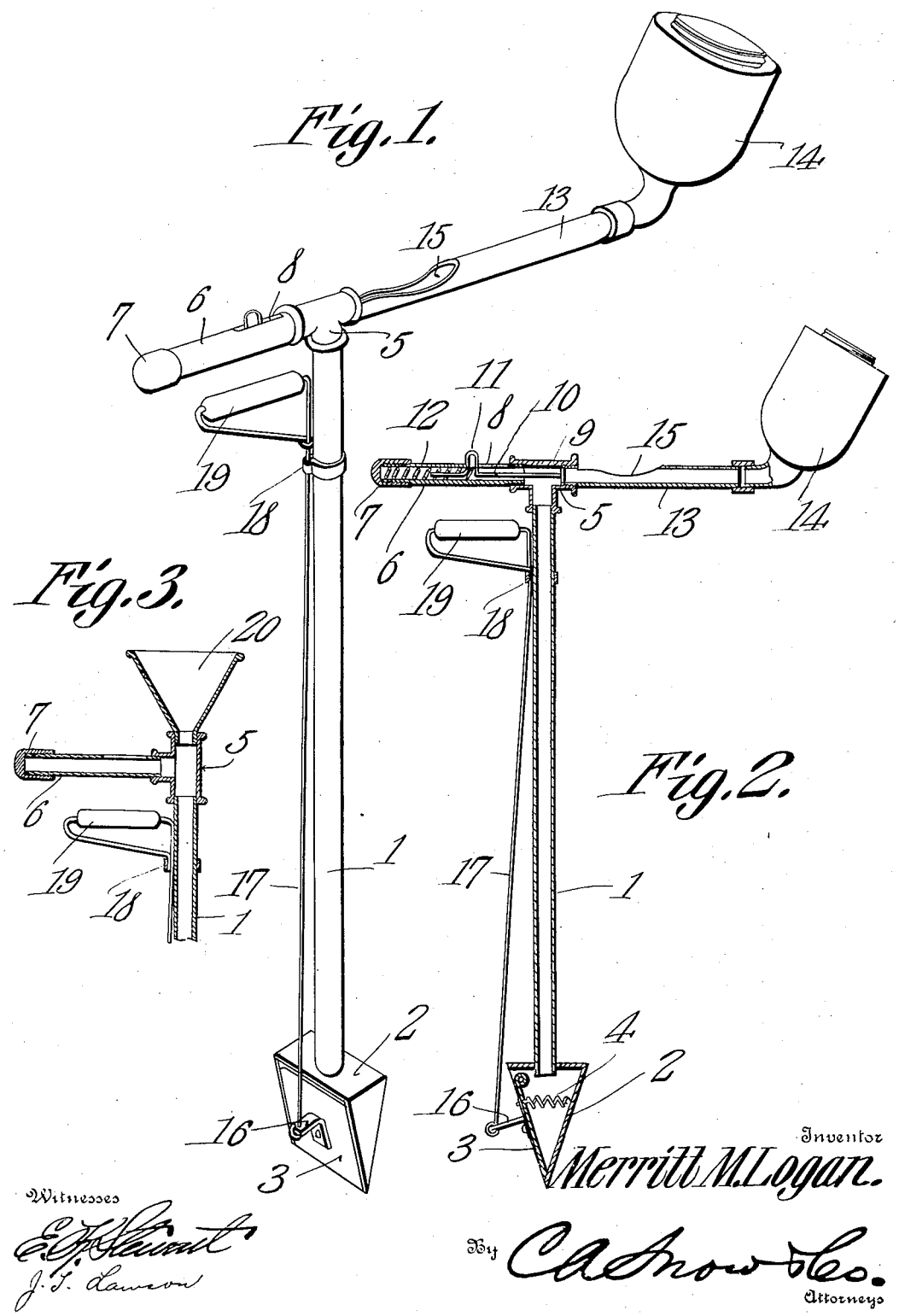

MERRITT M. LOGAN, OF SPRINGFIELD, MISSOURI.

HAND-PLANTER.

954,576.

Specification of Letters Patent.

Patented Apr. 12, 1910.

Application filed September 13, 1909. Serial No. 517,383.

*To all whom it may concern:*

Be it known that I, MERRITT M. LOGAN, a citizen of the United States, residing at Springfield, in the county of Greene and State of Missouri, have invented a new and useful Hand-Planter, of which the following is a specification.

This invention has relation to hand seed planters and it consists in the novel construction and arrangement of its parts as hereinafter shown and described.

The object of the invention is to provide a simple and an effective device for planting seed by hand in which the number of seeds to be planted may be readily separated from the bulk and the seed may be properly deposited in the soil at desired points.

In the accompanying drawings: Figure 1 is a perspective view of the planter. Fig. 2 is a vertical sectional view of the same. Fig. 3 is a vertical section through the upper portion of a modified form of planter.

The planter comprises a pipe 1 to the lower end of which is attached an approximately wedge shaped head 2. A hinged valve or door 3 forms one side of the head 2 and is normally held at its lower edge closed against the lower portion of the said head by means of a spring 4 which is interposed between the upper portion of the said valve or door 3 and the upper portion of the head 2. The spring 4 is a traction spring that is to say that its tension is such as to have a tendency to bring its opposite ends together and consequently the lower edge of the door or valve 3 is normally maintained in a closed position against the lower portion of the head 2.

A T connection 5 is located at the upper end of the pipe 1 and a pipe 6 is connected with one end of the said T connection 5 and at its other end is closed by a cap 7. The pipe 6 is provided in its upper side with a longitudinally disposed slot or opening 8. A valve 9 is located in the upper portion of the T connection 5 and is provided with a stem 10 which projects into the pipe 6 and at a point under the slot 8 is provided with an upwardly disposed portion 11 which projects through the said slot 8. A coil spring 12 is located in the pipe 6 and is interposed between the cap 7 and the projecting portion 11 of the stem 10 of the valve 9. The spring 12 is under tension with a tendency to hold the valve 9 against the end of a pipe 13 which connects with the T 5 at the opposit side from that with which the pipe 6 connects. A seed can or receptacle 14 is attached to the outer end of the pipe 13 and the said pipe 13 is provided in its upper side and in the vicinity of its point of connection with the T 5 with an opening 15. An outwardly disposed lug 16 is attached to the outer side of the valve or door 3 and the lower end of a rod 17 is pivotally connected with the said lug 16 and passes through a guide 18 attached to the pipe 1. At its upper end the rod 17 is provided with a handle 19 which is located below the pipe 6 and normally spaced therefrom.

The planter is used as follows: Presuming that the receptacle 14 contains the seed to be planted the seed may flow from the said receptacle 14 through the pipe 13 until it arrives at the opening 15 in the said pipe 13. An operator has one hand upon the pipe 13 and his thumb projects into the said pipe 13 through the opening 15. Thus he can govern or control the number of seed which will pass through the pipe 13 toward the valve 9. When the proper number of seed has passed toward the valve 9 and the operator arrives at the point where it is desired to plant the seed in the soil he depresses the planter so that the head 2 is forced into the soil and if need be he may use his foot upon the upper side of the head 2 to cause it to penetrate the soil. The operator then presses upon the projecting portion 11 of the stem 10 and moves the valve 9 away from the end of the pipe 13 and thus the seed against the said valve is permitted to fall through the pipe 1 into the head 2. The operator then grasps the handle 19 of the rod 17 and moves the said rod vertically whereby the gate or door 3 is swung upon its hinge against the tension of the spring 4 and is caused to assume an opened position. When the said gate or door 3 opens the seed falls from the head 2 into the incision made in the soil by the projection of the said head therein. By this assemblage of parts it will be observed that a simple and an effective hand planter is provided which may be easily and conveniently used for planting garden seed or replanting by hand a crop in which the first planting failed at points to develop or mature into plants.

The planter hereinbefore described is to be held by both hands while in use, but, if desired, the same can be readily rearranged so as to be manipulated by one hand. The rearranged planter has been illustrated in Fig. 3. In order to produce this modified form of planter, T-connection 5 is disconnected from the pipe 1 and the pipes 6 and 13 are also disconnected from said T-connection. The connection is then replaced on pipe 1, as shown in Fig. 3 and a funnel 20 is inserted in the upper portion of said connection and directly above the pipe 1. Pipe 6 is then replaced in engagement with the connection so as to extend laterally therefrom and above the handle 19. With the parts thus located, the hand clasping the pipe 6 can also be used for shifting the handle 19.

Having described my invention what I claim as new and desire to secure by Letters Patent is:

1. A planter comprising a pipe, a head attached to the end thereof and having a hinged valve with means for operating the same, a laterally disposed pipe attached to the upper end of the first said pipe and serving in part as a handle and a seed receptacle located at the outer end of the said laterally disposed pipe.

2. A planter comprising a pipe, a head attached to the lower end thereof and having a hinged valve with means for operating the same, a laterally disposed pipe connected with the upper end of the first said pipe and serving in part as a handle and being provided with an opening at its upper side and a seed receptacle attached to the outer end of the said laterally disposed pipe.

3. A planter comprising a pipe, a head attached to the lower end thereof and having a hinged valve with means for operating the same, a laterally disposed pipe connected with the upper portion of the first said pipe and serving in part as a handle, a seed receptacle connected with said laterally disposed pipe, a second laterally disposed pipe connected with the upper portion of the first said pipe, a valve located between the said laterally disposed pipe and adapted to close the outlet of the first said laterally disposed pipe and means located in the second laterally disposed pipe for resiliently holding the said valve against the first said laterally disposed pipe.

4. A planter comprising a pipe, a head attached to the lower end thereof and having a hinged valve provided with operating means, a laterally disposed pipe connected with the upper end of the said first pipe and serving in part as a handle, said laterally disposed pipe having in its upper side an opening, a seed receptacle located at the outer end of said laterally disposed pipe, a second laterally disposed pipe also connected with the upper end of the first said pipe, a valve located between the said laterally disposed pipes and adapted to operate against the first said laterally disposed pipe, a resilient means located in the second said laterally disposed pipe for holding the said valve against the first said laterally disposed pipe, said valve having a stem with a projecting portion which extends through an opening provided in the second said laterally disposed pipe.

In testimony that I claim the foregoing as my own, I have hereto affixed my signature in the presence of two witnesses.

MERRITT M. LOGAN.

Witnesses:
  T. J. GIDEON,
  J. T. WALKER.